United States Patent [19]

Tomes

[11] Patent Number: 4,743,454
[45] Date of Patent: May 10, 1988

[54] HAY PRESERVATIVE

[75] Inventor: Nancy J. Tomes, West Des Moines, Iowa

[73] Assignee: Pioneer Hi-Bred International, Inc., Des Moines, Iowa

[21] Appl. No.: 891,260

[22] Filed: Jul. 28, 1986

[51] Int. Cl.$^4$ ................................................ A23K 3/00
[52] U.S. Cl. ........................................ 426/61; 426/74; 426/335; 426/532; 426/636
[58] Field of Search .................. 426/61, 74, 335, 532, 426/636, 807

[56] References Cited

U.S. PATENT DOCUMENTS

| | | | |
|---|---|---|---|
| 2,295,643 | 9/1942 | Emery et al. | 426/74 |
| 2,999,752 | 9/1961 | Webb | 426/74 |
| 3,624,222 | 11/1971 | Nelson | 426/532 X |
| 3,937,814 | 2/1976 | Nickerson et al. | 426/61 X |
| 3,962,475 | 6/1976 | Forest et al. | 426/335 X |
| 4,034,117 | 7/1977 | Glabe | 426/636 X |
| 4,426,396 | 1/1984 | Young | 426/636 X |
| 4,476,112 | 10/1984 | Aversano | 426/532 |
| 4,556,505 | 12/1985 | Fenn | 426/335 X |
| 4,561,995 | 12/1985 | Fenn | 426/335 X |

*Primary Examiner*—R. B. Penland
*Attorney, Agent, or Firm*—Zarley McKee, Thomte, Voorhees & Sease

[57] ABSTRACT

A hay preservative composition, which is of at least two components, with the first component being an inorganic salt mixture of magnesium oxide, zinc oxide, and a water soluble copper ion source. The second component is an organic acid, or a water soluble salt of an organic acid, selected from the group consisting of acidic acid, propionic acid and sorbic acid.

12 Claims, No Drawings

HAY PRESERVATIVE

BACKGROUND OF THE INVENTION

The subject matter of this invention relates to a hay preservative composition, especially useful for high moisture hay. One of the problems with high moisture hay is spoilage and decay caused by spontaneously generated heat.

The conservation of nutrients in alfalfa and other green plants for animal feed is dependent on the method of preservation. Ideally, alfalfa could be rapidly harvested and immediately dried for maximum nutrient preservation. However, this is at present a technologically unfeasible alternative. The quality of alfalfa hay is, however, dependent on the same variables as would be a perfectly preserved product including: rate of moisture removal, temperature at which moisture is removed, temperature of subsequent storage, original nutritional composition, microbial load, and length of time at various moisture levels in the drying process. All of these factors are themselves influenced by field conditions such as humidity, temperature, rainfall, wind velocity (which influences drying rate) and, finally, by characteristics of the plants themselves such as maturity, cutting, general growing conditions and finally variety of alfalfa.

Imperically it would seem that extremely rapid field drying to low moistures prior to baling would be an optimal situation. This process, unfortunately, results in considerable nutritional losses due to leaf loss and lowered dry matter yields. Recognition of this fact has led hay producers to bale at higher moisture levels. This practice, however, results in molding and subsequent feed refusal, mycotoxicosis and inferior performance of animals. Thus, there is a real and continuing need for development of hay preservatives to enable producers to attain maximum quality of feed.

Ideally, a hay preservative should possess at least the following attributes: it should prevent molding of the bales at moisture contents of 20% to 30%; it should preserve the green color of the hay; it should preserve nitrogen in readily available form; it should accelerate the drying rate of treated hay; it should enhance animal performance over untreated bales prepared at similar moisture levels; it should increase overall on-farm efficiency by reducing harvest and post harvest losses; and it should as a general matter increase farm income by producing more high quality bales.

It is a primary objective of the present invention to provide a hay preservative composition, especially for use with high moisture hay such that the hay will still allow use as a maximum quality feed.

Another objective of the present invention is to provide an improved hay preservative which possesses most of the above listed attributes of an "ideal" preservative.

Another objective of the present invention is to prepare a hay preservative composition, which synergistically acts to effectively reduce heat in high moisture hay.

Yet another objective of the present invention is to provide a hay preservative which will provide a quality hay product as measured by temperature, dry matter recovery, nitrogen profile, color, and microorganism counts including yeasts and molds.

Another objective of the present invention is to provide a hay preservative which comprises at least a mixture of an inorganic salt component of zinc oxide, magnesium oxide, and a water soluble copper ion source; and a second component which is an organic acid selected from the group consisting of acetic acid, propionic acid and sorbic acid.

Another objective of the present invention is to provide a composition of three components which includes each of those just above listed in combination with a third component of microbial organisms, *Streptococcus faecium*.

SUMMARY OF THE INVENTION

This invention relates to a high moisture hay preservative composition. The composition has in one form at least two components, and in a preferred form at least three components. In the first two-component form, the composition is a mixture of an inorganic salt component which includes zinc oxide, magnesium oxide and a water soluble copper ion source, preferably copper sulfate; and, as a second component, an organic acid selected from the group consisting of acetic acid, propionic acid, and sorbic acid. In the preferred second embodiment, a third component consists of a microbial organism, *Streptococcus faecium*. There is a synergism between the two components, and as well the third component, to significantly reduce temperature and therefore degradative effects in alfalfa hay.

DETAILED DESCRIPTION OF THE INVENTION

The hay preservative composition of the present invention is a dry component mixture, which is diluted and used to treat hay, typically by spraying application. The composition that is hereinafter spoken of is referred to on a dry weight basis, unless otherwise stated.

In its broadest aspects, the composition comprises as a first component an inorganic salt mixture of zinc oxide, magnesium oxide and a water soluble copper ion source, combined with as a second component an organic acid, or a water soluble salt form of an organic acid, with the acid selected from the group consisting of acetic acid, propionic acid, and sorbic acid.

The amount of the inorganic salt mixture is from 4 weight percent to about 75 weight percent of the composition, preferably from about 35 weight percent to about 50 weight percent. It has been critical that the souce of zinc and magnesium be in fact the respective oxides. Thus, as the term "inorganic salt mixture" is used, it is understood that the phrase includes the oxide forms of zinc and magnesium. It has been found that other forms and sources of zinc and magnesium will not provide the significant heat reduction. Put another way, it is believed critical that the source of zinc be zinc oxide and the source of magnesium be magnesium oxide. However, with regard to the copper ion source, it is not critical to the composition that the precise salt form of copper be the preferred sulfate. Any water soluble copper ion sources are suitable, but one which works very satisfactorily is the preferred copper sulfate.

With regard to the first inorganic salt mixture component, within this component itself it is preferred that the ratio of magnesium oxide to zinc oxide to water soluble copper ion source be within the range of 100:10:1 to 100:50:5. The most preferred range of weight ratio for the zinc oxide, magnesium oxide and water soluble copper ion source is within the weight ratio range of 100:10:1 to 100:20:2.

The above mentioned inorganic salt mixture when combined with an organic acid, preferably sorbic acid, has been found to be very effective in preserving hay color and in controlling heat. Heat control is significantly enhanced by the mixture of the two, in comparison with using either alone.

The organic acid component is selected from the group of acetic acid, propionic acid and sorbic acid. It is, however, understood that water soluble salt forms of the acids such as, for example, potassium and sodium salts of the acids may be used and still come within the scope of this invention. The most preferred acid, because it seems to exhibit the most notable synergistic effect in combination with the inorganic salt component, is sorbic acid.

The amount of organic acid on a dry weight basis is from about 25 weight percent to about 96 weight percent of the preservative composition, preferably from about 50 weight percent to about 65 weight percent.

Surprisingly it has been found that the composition is even further enhanced from the standpoint of its preservative effect on high moisture hay if the composition contains certain microbial organisms. Those organisms are *Streptococcus faecium*. Others have been tried, but the synergism has not been demonstrated with those. However, when there is a combination of *Streptococcus faecium* with the first inorganic salt mixture component and the second organic acid component, in effect the temperature reduction is enhanced. Put another way, the cooling effect on the hay composition appears to be greater. This is surprising given the fact that *Streptococcus faecium* alone when combined with the hay makes it hotter.

The amount of organisms added is a sufficient amount to provide an organism concentration of at least $10^5$ per gram of weight of the composition, preferably a sufficient amount to provide an organism count of $10^5$ per gram of said composition to $10^{11}$ per gram of said composition.

There are certain preferred strains of *Streptococcus faecium* which have been isolated and found most preferable in the composition of this invention. Those strains are available upon request by the assignee and are identified as strains 248, 202, 451 and 434. The strains have been deposited with the American Type Culture Collection at Rockville, Md. and are further identified as A.T.C.C. Nos. 53518, 53519, 53520 and 53521, respectively. One may use a mixture of these preferred strains which is satisfactory, or any lesser combination of them, or simply a single strain. In the examples equal concentration mixtures were employed.

In accordance with the method of treatment of the hay of the present invention, the composition is simply dissolved in water and sprayed directly on the hay. The amount of suspending water is not critical, and typically the required amount is just a sufficient amount to dissolve the amount of dry preservative composition and still allow convenient spraying application. The amount of water needed to dissolve a typical treatment for current commercially availabe large round bales which often weigh within the 1,000 and 2,000 pound range would be about 5 gallons of water. Typical amounts to use for the treatment, based upon the tonnage of hay are from 0.50 pounds per ton up to 20 pounds per ton of hay, preferably from 0.50 pounds per ton of hay up to 3.0 pounds per ton of hay.

The following examples in table form are offered to further illustrate but not limit the composition and the method of treatment of the present invention.

EXAMPLES

In the examples which follow the methodology was as follows. Each treatment was applied to 5 bales of approximately 1,000 to 2,000 pounds. The exact amount applied was calculated on the basis of 1,500 pounds.

After data was taken from the field it was recorded on standard forms for later analysis. Each bale was labeled with a numbered plastic animal tag for recording its identity.

At each of 10 to 15 different locations there were 6 treatments and 5 bales per treatment. Data was entered on day 0, day 30 and at 120 days. The data included the following information: day, bale number, treatment, dry matter, yeasts and molds, *Streptococci*, ADF (measure of the amount of fiber in the feed), nitrogen, and recorded available protein.

The bale sampling procedure was as follows. Core samples were drilled from each rounded side of the bale and two core samples were taken from the top of the bale, thus totaling six core samples per bale. Core samples were collected and tested as later described. A total of six core samples yielded approximately 120 grams of hay. After each core sample was taken, the sampling cite was sealed with insulation foam. Daily temperature analysis occurred by placing a temperature probe on the surface of the bale in the shade and allowing 1 minute to equilibrate. This determined the ambient temperature. Thereafter, the ambient temperature was recorded on a data sheet and the temperature probe was placed in the middle of the bale and allowed one minute to equilibrate when the bale temperature was recorded.

Each of the date points were determined by standard procedures: Dry matter was determined by method #7.002 of the Association of Official Analytical Chemists, 1980, Thirteenth Edition. Nitrogen level was determined by Kjeldahl determination. ADF (cell wall material was determined by the Agricultural Handbook #379 *Forage Fiber Analysis*, Goering and Van Soest, 1970. ADF-N (bound Nitrogen to cell wall) was determined by a modification of the Van Soest techique, *The Use of Detergents in the Analysis of Fibrous Feeds*, Journal of Association of Official Analytical Chemists, 48:785, 1965. Color was determined by comparing visually to paint color reference strips.

In the following tables the bales tested were located at two locations in Iowa and one in Indiana. The overall methodology practices were the following. Alfalfa at 10%–20% bloom stage was harvested with a mower conditioner and allowed to dry to 20% to 28% moisture in the field in windrows. Thirty round bales, five per treatment were prepared, each weighing an average of 1500 pounds. Treatments were suspended in 25 gallon of water and sprayed, five gal/bale, on hay in the window, just prior to baling. Sprayers were rinsed well between treatments. Control untreated bales were prepared between each set of five treated bales.

Bales were sampled at day 0 for temperature and moisture and core samples were sent to the laboratory for chemical and microbiological analysis (ADF, ADF-N, yeasts and molds, lactic acid bacteria and nitrogen). Temperature was recorded daily for the first twenty days and then every five days thereafter. At 30 and 90 days, core samples were sent to the laboratory for chemical and microbiological analysis. At the end of the trial (usually 90 days) bales were opened and the interior examined for mold and color scores.

Thus, the overall design included six treatments and five bales per treatment for three cuttings. Control bales which were not treated were included and are referred to as treatment No. 6.

The following Table I shows the data summary for the Iowa and Indiana, locations, and Table II shows an additional data summary for the same locations.

ble protein available to the animal. "% AVAIL PRO AT DAY 90" refers to the amount of protein in the bale that is available to the animal. "% ADF INCR" refers to the increase or decrease (—) in the ADF in the hay during storage. "MOLD" refers to visable evaluation of the hay at day 60 for moldiness as measured on a scale of 0 (none) to 10 (completely moldy).

TABLE I

EFFECT OF TREATMENTS ON QUALITY ATTRIBUTES OF HAY

| CUT | TRT | DM | WT IN | TEMP | ADF | ADF N | YM | STREP | ACTINO | NITRO |
|---|---|---|---|---|---|---|---|---|---|---|
| 1 | 1 | 75.40 | 1814 | 41.58 | 39.46* | .661* | 4.88* | 4.05 | 3.24 | 3.10 |
|   | 2 | 73.60 | 2014 | 42.03 | 35.27 | .567 | 4.87* | 3.78 | 3.25 | 3.12 |
|   | 3 | 74.20 | 1776 | 44.25 | 35.38* | .368* | 4.69 | 3.50 | 3.00 | 3.03 |
|   | 4 | 73.50 | 1801 | 47.07 | 36.96 | .631* | 4.72 | 3.63 | 3.07 | 2.99 |
|   | 5 | 71.89 | 1862 | 41.96 | 37.35 | .617 | 4.33 | 3.24 | 3.27 | 3.13 |
|   | 6 | 73.73 | 1739 | 44.20 | 36.81 | .523 | 4.21 | 3.44 | 3.10 | 3.04* |
| 2 | 1 | 78.30 | 2125 | 55.82 | 39.77 | 1.463 | 4.42 | 2.43 | 3.00* | 3.77 |
|   | 2 | 82.20 | 1907 | 48.14* | 33.37* | .638* | 4.52 | 3.16* | 3.07 | 3.54* |
|   | 3 | 78.10 | 2096 | 48.67* | 32.20* | .769* | 4.46 | 3.46* | 3.01* | 3.70 |
|   | 4 | 80.80 | 1910 | 47.58* | 32.39* | .706* | 4.23 | 2.68* | 3.11 | 3.64* |
|   | 5 | 77.50 | 2132 | 50.48* | 33.71* | .812* | 4.59 | 2.74* | 2.96* | 3.66 |
|   | 6 | 78.60 | 1894 | 54.91 | 41.00 | 1.466 | 4.39 | 2.10 | 3.17 | 3.74 |
| 3 | 1 | 76.63 | 1530 | 41.68 | 37.58* | .737* | 4.49* | 3.95 | 3.06* | 3.62 |
|   | 2 | 76.50 | 1484 | 42.15 | 38.35 | .775 | 4.61 | 4.28 | 3.52 | 3.62 |
|   | 3 | 76.00 | 1459 | 41.71 | 38.63 | .918 | 5.41 | 4.19 | 3.22 | 3.72* |
|   | 4 | 74.87 | 1446 | 45.12* | 37.47* | .857 | 5.20 | 3.07* | 3.11* | 3.60 |
|   | 5 | 74.11 | 1450 | 43.78* | 41.04* | .979* | 5.36 | 3.34* | 3.34 | 3.55 |
|   | 6 | 74.70 | 1521 | 42.23 | 39.31 | .855 | 5.05 | 3.94 | 3.49 | 3.62 |

Asterisk denotes significantly different from the control (Treatment 6).

TABLE II

EFFECT OF TREATMENT ON NUTRIENT RECOVERY

| CUT | TRT | DM | WT_IN | % REC DM | % REC N | % REC AVAIL PROTEIN | % AVAIL PRO AT DAY 90 | % ADF INCR | MOLD | COLOR |
|---|---|---|---|---|---|---|---|---|---|---|
| 1 | 1 | 75.40 | 1814 | 91.94 | 105.45 | 82.29 | 76.24 | —5.90 | — | — |
|   | 2 | 73.60 | 2014 | 81.94* | 94.86 | 87.69 | 79.47 | —22.99 | — | — |
|   | 3 | 74.20 | 1776 | 91.12 | 103.36 | 95.02 | 85.23 | —16.26 | — | — |
|   | 4 | 73.50 | 1801 | 89.09 | 102.70 | 80.95 | 73.31 | —15.03 | — | — |
|   | 5 | 71.89 | 1862 | 96.39* | 110.13 | 83.11 | 76.41 | —5.50 | — | — |
|   | 6 | 73.73 | 1739 | 89.91 | 101.17 | 86.81 | 80.47 | —11.342 | — | — |
| 2 | 1 | 78.30 | 2125 | 95.05 | 109.39 | 60.09 | 63.25 | 55.15 | 0.00 | 20.67 |
|   | 2 | 82.20 | 1907 | 93.53 | 102.79 | 87.59* | 92.84* | 5.26* | .75 | 17.67 |
|   | 3 | 78.10 | 2096 | 93.80 | 105.46 | 78.89* | 83.82* | 16.62* | 1.25 | 17.67 |
|   | 4 | 80.80 | 1910 | 94.68 | 104.68 | 85.12* | 88.83* | 12.17* | .50 | 19.00 |
|   | 5 | 77.50 | 2132 | 90.27 | 102.98 | 76.52* | 79.65* | 22.00* | 1.75 | 20.25 |
|   | 6 | 78.60 | 1894 | 93.19 | 105.74 | 62.88 | 66.38 | 46.93 | 2.75 | 19.50 |
| 3 | 1 | 76.63 | 1530 | 89.52 | 95.40 | 82.00 | 76.59 | 16.89 | 1.75 | 14.00 |
|   | 2 | 76.50 | 1484 | 87.30 | 90.74 | 87.60 | 78.37* | 10.34 | 3.00 | 15.50 |
|   | 3 | 76.00 | 1459 | 88.28 | 95.73 | 75.07 | 76.51 | 28.35 | 2.50 | 16.75 |
|   | 4 | 74.87 | 1446 | 89.47 | 96.82 | 78.34 | 74.00 | 28.37 | 3.25 | 16.00 |
|   | 5 | 74.11 | 1450 | 86.88 | 89.52 | 74.55 | 67.63 | 30.45 | 3.75 | 17.00 |
|   | 6 | 74.70 | 1521 | 86.80 | 88.85 | 76.33 | 71.17 | 12.76 | 3.25 | 15.50 |

Asterisk denotes significantly different from the control (Treatment 6).

In Tables I and II "CUT" refers to the cutting of hay. "DM" refers to the dry matter content of the hay at baling. "WT IN" refers to the average weight of the five bales used per treatment for each location. "TEMP" refers to the mean internal temperature of the bales over the 60 day storage period. "ADF" refers to the fiber content of the hay. "ADF-N" refers to the amount of nitrogen bound to the fiber during the storage that may be unavailable to the animal eating the hay. "YM" refers to the yeast and mold count in the hay expressed as a $\log_{10}$ cell number per gram. "STREP" refers to the count of Streptococcus in the hay expressed on a $\log_{10}$ cell number per gram. "ACTINO" refers to the counts of actinomycetes in the hay expressed as a $\log_{10}$ call number per gram. "NITRO" refers to Kjeldahl nitrogen content of the hay. "% REC-DM" refers to the percentage recovery of dry matter. "% REC-N" refers to the percentage recovery of nitrogen. "% REC AVAIL PROTEIN" refers to the recovery of the solu- It can be seen that generally degradation, temperature, available protein, and color were significantly enhanced with the treatment of the invention in comparison with the controls.

Other data gathered would seem to suggest that the best composition was a composition which included zinc oxide, magnesium oxide, copper sulfate, sorbic acid and Streptococcus faecium, strains: 248, 202, 451 and 434. In each instance the treatment included the following compositions:

TABLE III*

| Treatment | Inorganic Salt Mixture | Salt Ratio (MgO, ZNO, CuSO$_4$) | Organic Acid (Potassium Sorbate) | Streptococcus faecium (Mixture of 4 Strains: 248, 202,451,434) |
|---|---|---|---|---|
| 1 | .67 | 100:10:1 | 6.67 | $10^6$/g |

TABLE III*-continued

| Treatment | Inorganic Salt Mixture | Salt Ratio (MgO, ZNO, CuSO4) | Organic Acid (Potassium Sorbate) | Streptococcus faecium (Mixture of 4 Strains: 248, 202,451,434) |
|---|---|---|---|---|
| 2 | .67 | 100:10:1 | 3.33 | $10^6$/g |
| 3 | .67 | 100:10:1 | 6.67 | $10^6$/g |
| 4 | .67 | 100:10:1 | 3.33 | $10^6$/g |
| 5 | .67 | 100:10:1 | .67 | $10^6$/g |

*Treatments are expressed here per ton of treated hay.

From an examination of the data for the invention, in comparison with the untreated bales it can be seen that the invention accomplishes at least all of its stated objectives.

What is claimed is:

1. A hay preservative composition, especially for high moisture hay consisting essentially of, in combination:
   a small but heat reducing effective amount of 4–75% by weight of said hay preservative composition of an inorganic salt mixture of zinc oxide, magnesium oxide and a water soluble copper ion source having a weight ratio of 100:10:1 to 100:20:1; and
   a small but heat reducing effective amount of 25–96% of said hay preservative composition of an organic acid, or a water soluble salt form thereof, selected from the group consisting of acetic acid, propionic acid, and sorbic acid.

2. The composition of claim 1 wherein the amount of inorganic salt mixture is from about 35 weight percent to about 50 weight percent of the composition.

3. The composition of claim 1 wherein the amount of organic acid is from about 50 weight percent to about 65 weight percent of said hay preservative composition.

4. The composition of claim 1 wherein the inorganic salt mixture of magesium oxide, zince oxide and water soluble copper ion are present within the weight ratio range of 100:10:1 to 100:50:5.

5. The composition of claim 1 which includes the microbial organisms, *Streptococcus faecium* which in combination with the inorganic salt mixture and the organic acid effectively aids in heat reduction.

6. The composition of claim 5 wherein the *Streptococcus faecium* are present at a level of at least $10^5$ per gram of weight of said composition.

7. The composition of claim 6 wherein the *Streptococcus faecium* are present at a level within the range of from $10^6$ per gram of said composition to $10^{11}$ per gram of said composition.

8. The composition of claim 5 wherein the microbial organism is *Streptococcus faecium* selected from the strains consisting of 248, 202, 451 and 434.

9. The composition of claim 1 wherein said copper salt is copper sulfate.

10. The composition of claim 1 wherein said organic acid is sorbic acid.

11. A method of treating hay for significantly reducing heat damage in high moisture hay and as well to preserve the same, said method comprising:
   selecting a hay preservative composition which comprises a small but heat reducing effective amount of 4–75% by weight of said hay preservative composition of an inorganic salt mixture of zinc oxide, magnesium oxide, and a water soluble copper ion source having a weight ratio of 100:10:1 to 100:20:1; and a small but heat reducing effective amount of 25–96% by weight of said preservative composition of an inorganic acid, or water soluble salt form thereof selected from the group consisting of acetic acid, propionic acid and sorbic acid;
   mixing said composition in a sufficient amount of water to fully suspend said composition; and
   treating said hay with from about 0.50 pounds per ton of hay to about 20 pounds per ton of hay with said composition.

12. The method of claim 11 wherein the amount of said composition employed for treating said hay is from about 0.50 pounds per ton of hay to about 3.0 pounds per ton of hay.

* * * * *